US009112856B2

(12) United States Patent
Harrison

(10) Patent No.: US 9,112,856 B2
(45) Date of Patent: Aug. 18, 2015

(54) GENERATION OF ONE TIME USE LOGIN PAIRS VIA A SECURE MOBILE COMMUNICATION DEVICE FOR LOGIN ON AN UNSECURE COMMUNICATION DEVICE

(71) Applicant: Google Inc., Mountain View, CA (US)

(72) Inventor: Ryan James Harrison, Mountain View, CA (US)

(73) Assignee: Google Inc., Mountain View, CA (US)

( * ) Notice: Subject to any disclaimer, the term of this patent is extended or adjusted under 35 U.S.C. 154(b) by 149 days.

(21) Appl. No.: 13/842,053

(22) Filed: Mar. 15, 2013

(65) Prior Publication Data
US 2014/0282962 A1 Sep. 18, 2014

(51) Int. Cl.
*G06F 21/00* (2013.01)
*H04L 29/06* (2006.01)
*G06F 21/34* (2013.01)
*G06F 21/42* (2013.01)

(52) U.S. Cl.
CPC ............ *H04L 63/0838* (2013.01); *G06F 21/34* (2013.01); *G06F 21/42* (2013.01)

(58) Field of Classification Search
CPC ......... G06F 21/34; G06F 21/35; G06F 21/42; G06F 21/43
USPC ..................... 726/5, 6, 7, 9, 20; 713/172, 185
See application file for complete search history.

(56) References Cited

U.S. PATENT DOCUMENTS

| 7,552,467 | B2 | 6/2009 | Lindsay |
| 8,572,684 | B1 * | 10/2013 | Sama ................................. 726/2 |
| 2006/0206919 | A1 | 9/2006 | Montgomery et al. |
| 2007/0079135 | A1 * | 4/2007 | Saito ............................. 713/183 |
| 2010/0042847 | A1 * | 2/2010 | Jung et al. ..................... 713/183 |
| 2011/0055891 | A1 | 3/2011 | Rice |

FOREIGN PATENT DOCUMENTS

WO 0201462 A2 1/2002

OTHER PUBLICATIONS

ISR of PCT/US2014/027041 dated Jun. 4, 2014.

* cited by examiner

*Primary Examiner* — Edward Zee
(74) *Attorney, Agent, or Firm* — Morris & Kamlay LLP

(57) ABSTRACT

A trusted communication device may generate and display a single use user ID and/or password to be utilized for one time validation of a communication session between an unsecure communication device and a secure communication device. The generated single use user ID and/or password may be communicated from the trusted communication device to a security server that handles security for the communication session. The user utilizes the presented user ID and password pairs to log into a communication session on the unsecure communication device. A heartbeat message may be communicated between the trusted communication device and the security server, and whenever the communicated heartbeat message fails, the user ID and password pair and/or one or more corresponding authentication tokens are deauthorized. A communication session that utilizes the presented user ID and password pair may be manually disabled from the trusted communication device.

18 Claims, 4 Drawing Sheets

GENERATION OF ONE TIME USE LOGIN PAIRS VIA A SECURE MOBILE COMMUNICATION DEVICE FOR LOGIN ON AN UNSECURE COMMUNICATION DEVICE

CROSS-REFERENCE TO RELATED APPLICATIONS/INCORPORATION BY REFERENCE

Not Applicable.

FIELD

Certain embodiments of the disclosure relate to communication. More specifically, certain embodiments of the disclosure relate to a method and system for generation of one time use login pairs via a secure mobile communication device for login on an unsecure communication device.

BACKGROUND

When travelling, it is quite common for people to access secure services such as email using computers that they do not control. This may include systems like a friend's computer, Internet cafes, and so on. A person may take reasonable efforts to make sure that there are no physical keyloggers and such attached. However, but it may be impossible to guarantee that the system hasn't been compromised.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A system and/or method is provided for generation of one time use login pairs via a secure mobile communication device for login on an unsecure communication device, substantially as shown in and/or described in connection with at least one of the figures, as set forth more completely in the claims.

A trusted communication device, which is operable to communicate with a security server, presents a user ID and password pair to be utilized for one time validation of a communication session on an unsecure communication device. The communication session occurs between the unsecure communication device and a secure communication device. The unsecure communication device, the trusted communication device, the security server and the secure communication device are separate and distinct devices. The user ID and password pair are generated by the trusted communication device or the security server. When the user ID and password pair is generated by the security server, the user ID and password pair is communicated from the security server to the trusted communication device. The presented user ID and password pair are utilized on the unsecure communication device to access the communication session from the unsecure communication device.

These and other advantages, aspects and novel modules of the present disclosure, as well as details of an illustrated embodiment thereof, will be more fully understood from the following description and drawings.

DETAILED DESCRIPTION

Figure 1:
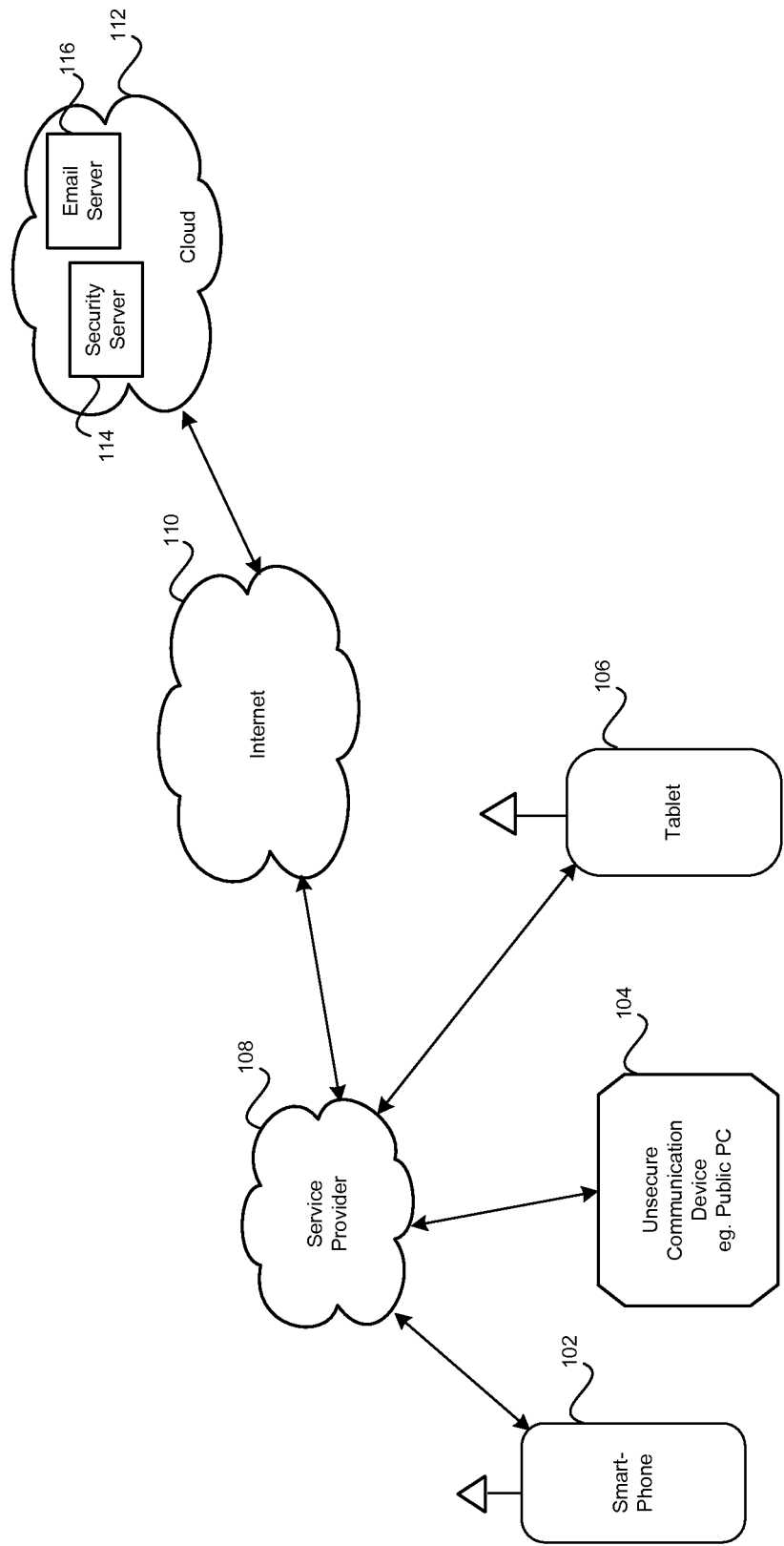
FIG. 1 is a block diagram of an example system for generation of one time use login pairs via a secure mobile communication device for login on an unsecure communication device, in accordance with an embodiment of the disclosure.

Certain embodiments of the disclosure may be found in a method and system for generation of one time use login pairs via a secure mobile communication device for login on an unsecure communication device. In various embodiments of the disclosure, a mobile communication device is operable to communicate with a security server. The mobile communication device or the secure server may be operable to generate one or more single use user ID and password pairs to be utilized for one time validation of a communication session between an unsecure communication device and a secure communication device such as an email server. In instances where the mobile communication device generates the one or more single use user ID and password pairs, the mobile communication device may be operable to communicate one or more single use user ID and password pairs the security server. In instances where the security server generates the one or more single use user ID and password pairs, the security server may communicate the one or more single use user ID and password pairs to the mobile communication device. The unsecure communication device, the secure communication device, the mobile communication device and the server are separate and distinct devices. The mobile communication device may be operable to visually and/or aurally present the one or more single use user ID and password pairs to a user of the mobile communication device. The user may utilize the presented one or more single use user ID and password pairs to log into one or more communication sessions from the unsecure communication device.

In an aspect of the disclosure, the mobile communication device may be operable to communicate a heartbeat message between the mobile communication device and the security server. The presented one or more user ID and password pairs and/or one or more corresponding authentication tokens may be deauthorized whenever there is a failure of the heartbeat message. A user of the mobile communication device may manually disable, from said mobile communication device, one or more corresponding communication session that utilizes the presented one or more single use user ID and password pairs. The presented one or more single use user ID and password pairs may be added by the security server to a pool of corresponding valid ID and password pairs for one or more corresponding communication sessions handled by said security server. The presented one or more single use user ID and password pairs may be deleted, by the security server, from the pool of corresponding valid ID and password pairs maintained by the security server after it is first used. The security server does not create a persistent cookie or other mechanism that allows other users of the unsecure mobile communication device to log in without entering the one or more user ID and password pairs. The mobile communication device may be operable to dismiss the presented one or more single use user ID and password pairs from the mobile communication device after a specified time period has elapsed.

It should readily be understood that although a single use user ID and password pair may be provided to a user so that the user may utilize the single use user ID and password pair to log into a communication session from an unsecure communication device, the disclosure is not limited in this regard. Accordingly, other embodiments of the disclosure may provide a single use user ID or a single use user password to enable the user to log into the communication session from the unsecure communication device.

FIG. 1 is a block diagram of an example system for generation of one time use login pairs via a secure mobile communication device for login on an unsecure communication device, in accordance with an embodiment of the disclosure. Referring to FIG. 1, there is shown a mobile communication device 102, an unsecure communication device 104, a tablet 106, a service provider 108, the Internet 110, a cloud 112, a security server 114 and an email server 116.

The mobile communication device 102 may comprise suitable logic, circuitry, interfaces and/or code that may be operable to run one or more applications. The mobile communication device 102 may be operable to utilize an application to communicate with the security server 114, via the service provider 108 and the Internet 110. The application may be utilized to generate one or more single use user ID and password pairs which may be communicated to the security server 114. The one or more single use user ID and password pairs may be utilized to securely log into a communication session and/or service utilizing an unsecure communication device such as the unsecure communication device 104. The mobile communication device 102 may communicate with the security server 114 via a dedicated application running on the mobile communication device 102 or via a general purpose application such as a browser running on the mobile communication device 102. The secure communication device is not limited to the mobile communication device 102. Accordingly, devices other than a mobile phone may be utilized as a secure communication device if they are trusted. Accordingly, in the various embodiments of the disclosure, the distinction between a secure communication device and an unsecure communication device is based on whether the communication device is trusted or untrusted. Hence, a secure communication device comprises a device that is trusted and an unsecure communication device comprises a device that is not trusted or untrusted.

The unsecure communication device 104 may comprise suitable logic, circuitry, interfaces and/or code that may be operable to communicate over the Internet 110 via the service provider 108. A user of the unsecure communication device 104 may utilize a single use user ID and password pair for one-time validation in order to gain access to a secure service that may be hosted via the Internet 110 and/or the cloud 112. For example, the user of the unsecure communication device 104 may utilize a single use user ID and password pair for one-time validation in order to gain access to an email account that may be hosted in the cloud 112. For illustrative purposes, the unsecure communication device 104 may comprise, for example, mobile devices (tablets, phones, etc), a personal computer (PC), a laptop or a web-connected television, which may be at a public location. However, it should be recognized that although the mobile devices (tablets, phones, etc), the personal computer (PC), the laptop and/or the web-connected television may be viewed as unsecure communication devices, there may be instances when the mobile devices (tablets, phones, etc), the personal computer (PC), the laptop and/or the web-connected television may be the secure communication devices.

The tablet 106 may comprise suitable logic, circuitry, interfaces and/or code that may be operable to run one or more applications. The tablet 106 may be operable to utilize an application to communicate with the security server 114, via the service provider 108 and the Internet 110. The application may be utilized to generate one or more single use user ID and password pairs, which may be communicated to the security server 114. The one or more single use user ID and password pairs may be utilized to securely log into a communication session and/or service utilizing an unsecure communication device such as the unsecure communication device 104. The tablet 106 may communicate with the security server 114 via a dedicated application running on the tablet 106 or via a general purpose application such as a browser running on the tablet 106.

The service provider 108 may comprise suitable devices and interfaces that may be operable to provide Internet based services to various communication devices. In this regard, the service provider 108 may provide Internet based services to the various mobile communication devices using a wired and/or a wireless communication medium. For example, the service provider 108 may provide access to Internet based services hosted by the Internet 110 to each of the mobile communication device 102 and the tablet 106 utilizing wireless technologies. The service provider 108 may also provide access to cloud based services offered by the cloud 112, for example, services offered by the security server 114. The service provider 108 may provide access to Internet based services as well as cloud based services to the unsecure communication device 104 utilizing a wired and/or wireless medium. The service provider 108 may comprise a cellular, satellite, cable or DSL service provider.

The Internet 110 may comprise suitable devices and interfaces that enable interconnectivity and communication amongst a network of computers, mobile communication devices and servers. The service provider 108 may be operable to provide access to services on the Internet 110 for each of the mobile communication device 102, the unsecure communication device 104 and the tablet 106. The Internet 110 may host one or more application servers and/or game servers that may enable users of the mobile communication device 102, the unsecure communication device 104 and the tablet 106 to download applications, games, play single player as well as multiplayer games, download music, videos and/or other content.

The cloud 112 may host one or more servers that may enable users of the mobile communication device 102, the unsecure communication device 104 and/or the tablet 106 to acquire and/or interact with content on one or more cloud-based servers. The service provider 108 may be operable to provide access to services in the cloud 112 for each of the mobile communication device 102, the unsecure communication device 104 and the tablet 106. The cloud 112 may host the secure server 114, which may be operable to receive one or more single use user ID and password pairs from the mobile communication device 102. The cloud 112 may be accessible by the mobile communication device 102, the unsecure communication device 104 and/or the tablet 106 via the Internet 110. The cloud 112 may host one or more application servers, email servers, content servers and/or game servers that may enable users of the mobile communication device 102, the unsecure communication device 104 and the tablet 106 to access email, download applications, games, play single player as well as multiplayer games, download music, videos and/or other content.

The security server 114 may comprise suitable logic, circuitry, interfaces and/or code that may be operable to manage security for one or more servers and/or services that may be hosted on the Internet 110 and/or the cloud 112. For example, the security server 114 may handle security for store applications, email servers, music, video and/or other content that may be accessed and/or downloaded by one or more of the mobile communication device 102, the unsecure communication device 104 and the tablet 106. In an embodiment of the disclosure, the security server 114 may be operable to store accounting as well corresponding information for content that may be handled by the store application server 114.

The security server 114, which may be located in the cloud 112, may be operable to receive one or more single use user ID and password pairs, one or more single use user ID and/or one or more single use password, which may be generated by an application running on the mobile communication device 102 and/or the tablet 106. The user of the mobile communication device 102 or the tablet 106 may utilize the issued one or more user ID and password pairs, the one or more single use user ID and/or the one or more single use password to access the servers and/or services that may be handled by the security server 114 and hosted on the Internet 110 and/or on the cloud 112. For example, the user of the mobile communication device 102 or the tablet 106 may utilize the issued one or more single use user ID and password pairs, the one or more single use user ID and/or the one or more single use password to log into an email server in order to access email.

The email server 116 may comprise suitable logic, circuitry, interfaces and/or code that may be operable to provide email services to users of the mobile communication device 102. The email server 116 may be located in the cloud 112 or on the Internet 110. The user of the mobile communication device 102 or the tablet 106 may utilize the generated one or more user ID and password pairs, the one or more single use user ID and/or the one or more single use password to access their email account on the email server 116. The security server 114 may be operable to handle secure access to the email server 116. For example, the user of the mobile communication device 102 or the tablet 106 may utilize the generated single use user ID and password pair, single use user ID and/or single use password that may be presented or displayed on the mobile communication device 102 to log into the email server 116 from the unsecure communication device 104 in order to access the user's email account.

In operation, it may be desirable for a user of the mobile communication device 102 to utilize the unsecure communication device 104 to access email, which may be hosted by an email server 116 within the cloud 112. The security server 114 may be operable to handle secure access to the email server 116 within the cloud 112. The user of the mobile communication device 102 may utilize a browser or a dedicated application running on the mobile communication device 102 to communicate with the security server 114. Based on information that may be associated with the mobile communication device 102, the application running on the mobile communication device 102 may be operable to generate and send the single use user ID and password pair, the single use user ID and/or the single use user password to the security server 114. The single use user ID and password pair, the single use user ID and/or the single use user password may be displayed on a display of the mobile communication device 102 where it may be viewed by the user of the mobile communication device 102.

The user of the mobile communication device 102 may read the single use user ID and password pair, the single use user ID and/or the single use user password from the display of the mobile communication device 102. The user may then enter a URL that is utilized to access the email server 114 into a browser window that is displayed on the unsecure communication device 104. The browser may present one or more dialogs requesting the user of the unsecure communication device 104 to enter the single use user ID and password pair, the single use user ID or the single use user password. The single use user ID and password pair, the single use user ID or the single use user password is then authenticated and if the single use user ID and password pair, the single use user ID or the single use user password is entered correctly, the user of the unsecure communication device 104 may utilize the unsecure communication device 104 to access their email on the email server 116.

Figure 2:
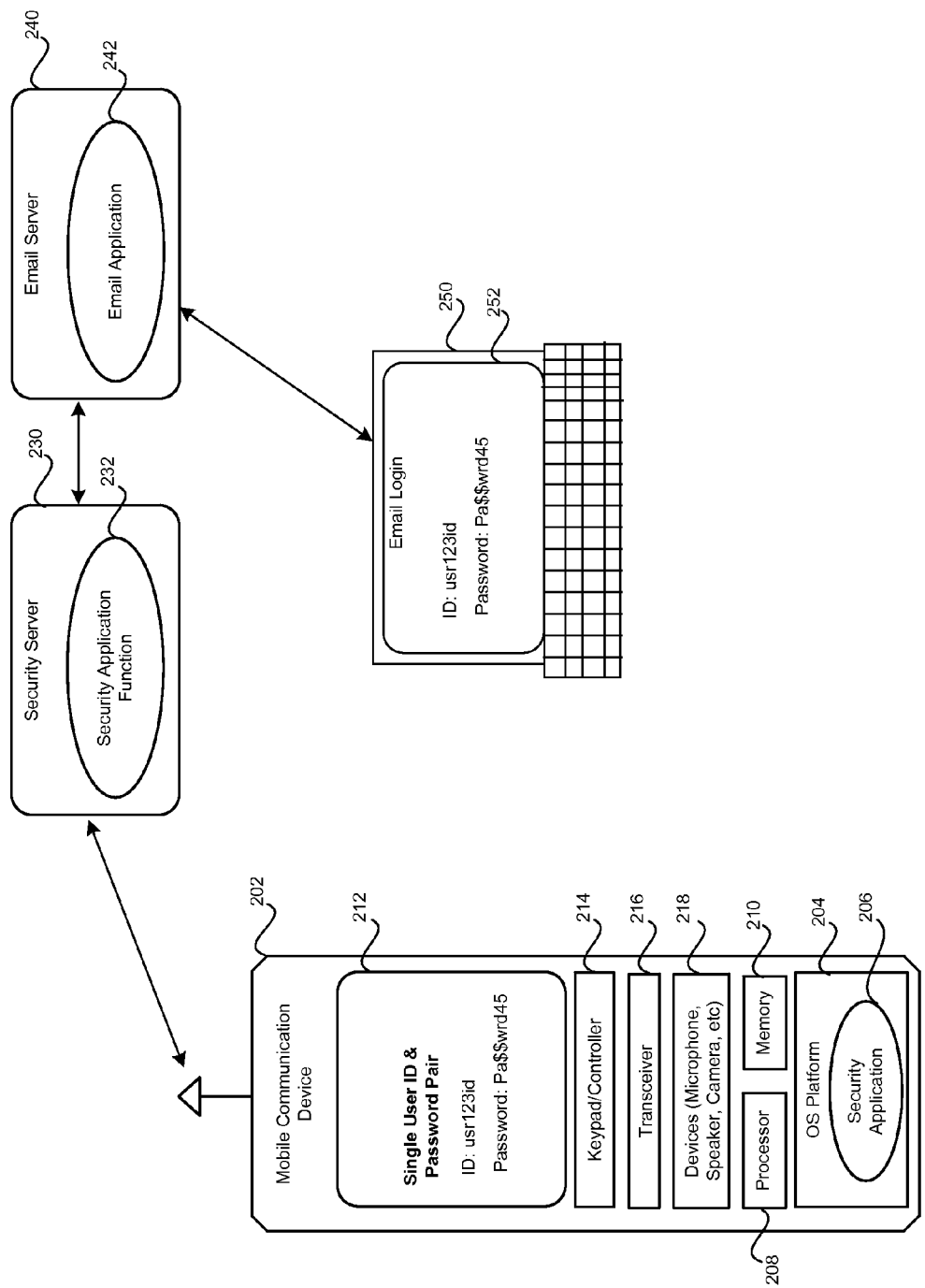
FIG. 2 is a block diagram that illustrates an example system that utilizes generated one time user login pairs to securely log on to an email server utilizing an unsecure communication device, in accordance with an embodiment of the disclosure.

FIG. 2 is a block diagram that illustrates an example system that utilizes generated one time user login pairs to securely log on to an email server utilizing an unsecure communication device, in accordance with an embodiment of the disclosure. Referring to FIG. 2, there is shown a mobile communication device 202, a security server 230, an email server 240, and an unsecure communication device 250. The mobile communication device 202 comprises an operating system (OS) platform 204, a processor 208, memory 210, display 212, keypad controller 214 and a transceiver 216. The OS platform 204 comprises a security application 206. The mobile communication device 202 may also comprise a microphone, speaker and a camera, which are collectively referenced as devices 218. The security server 230 comprises a security application function 232. The email server 240 may comprise an email application 242. The unsecure communication device 250 may comprise a display 252.

The mobile communication device 202 may comprise suitable logic circuitry, interfaces and/or code that may be operable to communicate utilizing one or more wired and/or wireless technologies. In an example embodiment of the disclosure, the mobile communication device 202 may communicate wirelessly utilizing, for example, 802.11 a/b/g/n/e/ac, 802.16, 3G, 4G, and/or Bluetooth. In one embodiment of the disclosure, the mobile communication device 202 may comprise a smartphone. The mobile communication device 202 may comprise an OS platform 204 that is operable to generate a single use user ID and password pair, a single use user ID and/or a single use password for a particular user account. For example, the OS platform 204 may be operable to generate a single use user ID and password pair, a single use user ID and/or a single use password for a an email account of a user of the mobile communication device 202. The mobile communication device 202 may be operable to communicate the generated single use user ID and password pair, the single use user ID or the single use password to the security server 230 and also present the generated single use user ID and password pair, the single use user ID or the single use password on the mobile communication device 202 via the display 212. The mobile communication device 202 may be substantially similar to the mobile communication device 102, which is described with respect to FIG. 1.

The OS platform 204 may comprise suitable logic, interfaces and/or code that may be operable to control operation of the mobile communication device 202. For example, the OS platform 204 may enable a user to interact with mobile communication device 202 and to run or execute applications. The OS platform 204 may comprise a security application 206.

The security application 206 may comprise suitable logic, interfaces and/or code that may be operable to handle generation of a single use user ID and password pair, a single use user ID and/or a single use user password from the security server 230, which may be utilized to securely log into the email server 240 from the unsecure communication device 250. In one embodiment of the disclosure, the security application 206 may be integrated as part of the OS platform 204. In this regard, the security application 206 may not be an application that runs on the operating system platform 204, but instead, may be integrated as part of the operating system platform 204. However, the disclosure is not limited in this regard and in other embodiments of the disclosure, the security application 206 may comprise an application that may be running on the OS platform 204. In this regard, the user of the mobile communication device 202 may open the security application 206 when the user desires to log into the email server 240 from the unsecure communication device 250. Once the security application 206 is opened, the security application 206 may present a list of accounts to the user of the mobile communication device 202. The user may select the account for the email server 240.

The security application 206 may be operable to generate the single use user ID and password pair, the single use user ID or the single use user password utilizing, for example, a randomized generator. In this regard, when the security application 206 is opened, the security application 206 may be operable to generate the single use user ID and password pair, the single use user ID and/or the single use user password for a particular communication session. The security application 206 may communicate the generated single use user ID and password pair, the single use user ID or the single use user password to the security application function 232 in the security server 230. The security application function 232 may add the generated single use user ID and password pair, the single use user ID or the single use user password to the list of valid login information for the user for the particular communication session. The security application function 232 may flag the generated single use user ID and password pair, the single use user ID and/or the single use user password to indicate that it is only for a single use and no corresponding persistent cookie or other mechanism should be created to extend the life of the cookie beyond the time it is deauthorized. The security application function 232 may flag the generated single use user ID and password pair, the single use user ID and/or the single use user password to indicate that any corresponding authentication token should also be deactivated once the generated single use user ID and password pair, the single use user ID and/or the single use user password is deactivated.

In other embodiments of the disclosure, the security application 206 may comprise, for example, a button that enables manual deauthorization of the generated single use user ID and password pair, the single use user ID and/or the single use user password. Once the button is activated, the generated single use user ID and password pair, the single use user ID and/or the single use user password and any corresponding authentication token is deauthorized and this results in the termination of the corresponding communication sessions.

The processor 208 may comprise suitable logic, circuitry, interfaces, and/or code that may be operable to execute code or otherwise control operation of the mobile communication device 202. For example, the processor 208 may be operable to control the OS platform 204, security application 206, the memory 210, the display 212, the keypad/controller 214 and the devices 218. In accordance with various embodiments of the disclosure, the processor 208 may be operable to handle execution of operations of the security application 206, which may be utilized to generate the single use user ID and password pair, the single use user ID and/or the single use user password and communicate it to the security server 230.

The memory 210 may comprise suitable logic, circuitry, interfaces, and/or code that may be operable to store operating and temporary data for the mobile communication device 202. For example, the memory 210 may be enabled to store configurations and operation data for the mobile communication device 202. The memory 210 may be operable to store OS platform information and data, as well as data utilized by the security application 206 to generate and display the single use user ID and password pair, the single use user ID and/or the single use user password on the mobile communication device 202.

The display 212 may comprise suitable logic, circuitry, interfaces, and/or code that may be operable to display a user interface that enables a user to interact with the mobile communication device 202. For example, the display 212 may be utilized to configure the mobile communication device 202 as well as provide user interaction when playing a game, and when generating and displaying the single use user ID and password pair, the single use user ID and/or the single use user on the mobile communication device 202. In this regard, the display 212 may provide visual and/or touch interface that enables interaction with the mobile communication device 202. The display 212 may comprise LED, LCD or variants thereof.

The keypad controller 214 may comprise suitable logic, circuitry, interfaces, and/or code that may be operable to control and manipulate the mobile communication device 202. In this regard, the keypad controller 214 may be utilized to control applications such as games and the security application 206, which may be running on the mobile communication device 202. The keypad controller 214 may be utilized to open the security application when the user wants to utilize the unsecure communication device 250 to access the email server 240. The keypad controller 214 may comprise a physical set of keys or buttons, and/or a software generated set of keys.

The transceiver 216 may comprise suitable logic, circuitry, interfaces, and/or code that may be operable to provide wireless communication for the mobile communication device 202. For example, the transceiver 216 may be operable to handle wireless technologies such as, for example, 802.11 a/b/g/n/e, 802.16, 3G, 4G, and/or Bluetooth. Although a single transceiver is shown, there may be a plurality of transceivers to handle a plurality of wireless communication technologies.

The mobile communication device 202 may also comprise a microphone, speaker and a camera, which are collectively referenced as devices 218. The microphone and camera may be operable to respectively capture voice and video, for example, when a user of the mobile communication device may be engaged in gameplay and video conferencing. The microphone may capture voice for audio calls. The speaker may be utilized to play audio. In instances where the mobile communication device 202 is a smartphone, the microphone, speaker and/or camera may be integrated as part of the smartphone. The speaker may be utilized to play an audio representation of the single use user ID and password pair, the single use user ID and/or the single use user password, which may be generated by the mobile communication device 202.

The security server 230 may comprise suitable logic, circuitry, interfaces and/or code that may be operable to handle security for one or more services such as the email server 240. The security server 230 may be operable to receive, from the mobile communication device 202, the single use user ID and password pair, the single use user ID and/or the single use user password, which may enable the user of the mobile communication device 202 to utilize the unsecure device 250 to securely log into the email server 240. In another embodiment of the disclosure, the security server 230 may be operable to generate the one or more single use user ID and password pairs. In instances where the security server 230 generates the one or more single use user ID and password pairs, the security server 230 may be operable to communicate the generated one or more single use user ID and password pairs to the mobile communication device 202.

The security application function 232 may comprise suitable logic, interfaces and/or code that may be operable to handle management of the security function for the security server 230. In this regard, the security application function 232 may be operable to receive a generated single use user ID and password pair, a single use user ID or a single use user password for the user from the mobile communication device 202. The user may use the unsecure communication device 250 to securely log into the email server 240 utilizing the generated single use user ID and password pair, the single use user ID or the single use user password. The security application function 232 may also be operable to authenticate or validate the ID and password that is entered on the unsecure communication device 250 when the user utilizes the unsecure communication device 250 to log into the email server 240. In embodiment of the disclosure where the security server 230 may be operable to generate the one or more single use user ID and password pairs, the security application function 232 may be operable to generate the one or more single use user ID and password pairs. In instances where the security application function 232 generates the one or more single use user ID and password pairs, the security application function 232 may be operable to communicate the generated one or more single use user ID and password pairs from the security server 230 to the mobile communication device 202.

The security server 230 may be operable to read one or more flags associated with the single use user ID and password pair, the single use user ID and/or the single use password. The one or more flags may indicate that single use user ID and password pair, the single use user ID and/or the single use password are to be utilized only once for the account to which they are being added or utilized. Accordingly, once the security server 230 recognizes that the single use user ID and password pair, the single use user ID and/or the single use password has been utilized, the security server 230 is operable to deauthorize and deleted or purge them from the security server 230. The security server 230 may also be operable to read a flag for the single use user ID and password pair, the single use user ID and/or the single use password, which indicates that no persistent session cookie or other mechanism that would allow other users of the unsecure communication device 250 to login to the email server 240 without entering valid credentials is permitted. In instances where an authentication token is utilized to log into other related services for the user such as calendar, messaging, and/or social networks, once the single use user ID and password pair, the single use user ID and/or the single use password has been deauthorized, then the security server 230 also deauthorizes the authentication token.

The email server 240 may comprise suitable logic, interfaces and/or code that may be operable to handle a plurality of email accounts, which comprises the email account for the user of the mobile communication device 202. The email server 240 may be operable to receive a login and a password from the unsecure communication device when the unsecure communication device 250 is utilized by the user to access the user's email account. The email server 240 may be operable to communicate with the security server 230 in order for the security server 230 to authenticate the received login and password. Based on the authentication, the user may be allowed or denied access to their email account on the email server 240 from the unsecure communication device 250.

The email application 242 may comprise suitable logic, interfaces and/or code that may be operable to handle operation for each of the plurality of email accounts on the email server 240. The email application 242 may be operable to receive the login and password that was entered on the unsecure communication device 250 and communicate with the security application function 232 in the security server 230 to determine whether the login and password that was entered are valid.

In operation, the user of the mobile communication device 202 may open the security application 206 whenever the user wants to utilize the unsecure communication device 250 to log into the email server 240. After the security application 206 is opened, the security application 206 may present a list of accounts to the user of the mobile communication device 202. The user may select the corresponding email account for the email server 240. The security application 206 may generate the single use user ID and password pair, the single use user ID and/or the single use password, which may be utilized by the user to log into the email server 240 from the unsecure communication device 250. The security application 206 in the mobile communication device 202 may be operable to present the single use user ID and password pair, the single use user ID and/or the single use password via audio and/or visually to the user of the mobile communication device 202.

The user may enter the URL of the email server 240 on a browser of the unsecure communication device 250. The email server 240 may then cause the corresponding login page to be displayed in the browser window on the display 252 of the unsecure communication device 250. The user may then enter the single use user ID and password pair, the single use user ID and/or the single use password into a login dialog that is displayed in the browser window on the display 252 on the unsecure communication device 250. The email server 240 may be operable to receive a login and a password from the unsecure communication device when the unsecure communication device 250 is utilized by the user to access the user's email account. The email server 240 may be operable to communicate with the security server 230 in order for the security server 230 to authenticate or validate the received login and password. If the authentication is successful, then the user is allowed to access their email account on the email server 240. If the authentication is unsuccessful, then the user is not allowed to access their email account on the email server 240. A successful authentication occurs when login and password that was entered on the unsecure communication device 250 matches the single use user ID and password that was generated by the security server 230. The display 212 of the mobile communication device 202 displays the single use user ID and password that was generated by the security server 230. The display 252 of the unsecure communication device 250 displays the login and password that was entered on the unsecure communication device 250. Since they are the same, this would result in a successful authentication.

In accordance with an embodiment of the disclosure, a heartbeat or keep-alive signal or message may be communicated between the security application 206 on the mobile communication device 202 and the security server 230. If the heartbeat or keep-alive signal is not communicated between the security application 206 and the security application function 232 that may be running on the security server 230, the generated valid login key pair and any authentication token may be deauthorized. This may be particularly useful, for example, if the battery dies, then the generated single use user ID and password, the single use user ID or the single use user password and any authentication token may be deauthorized, thereby terminating an corresponding communication session.

Figure 3:
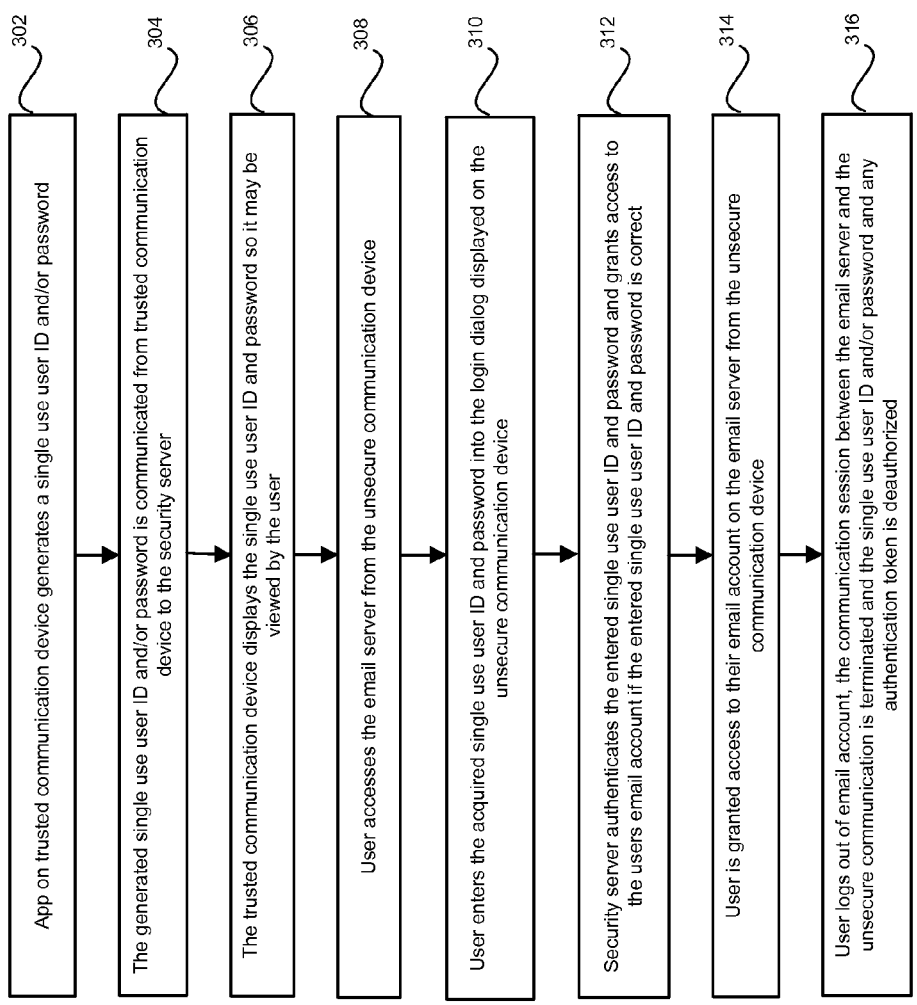
FIG. 3 is a flow chart that illustrates example steps for generating and utilizing one time user login pairs to securely log on to an email server utilizing an unsecure communication device, in accordance with an embodiment of the disclosure.

FIG. 3 is a flow chart that illustrates example steps for generating and utilizing one time user login pairs to securely log on to an email server utilizing an unsecure communication device, in accordance with an embodiment of the disclosure. Referring to FIG. 3, there are shown example steps 302-316. In step 302, an app on a trusted communication device is utilized to generate a single use user ID and/or password. In step 304, the generated single use user ID and/or password is communicated from the trusted communication device to the security server. In step 306, the trusted communication device displays the single use user ID and/or password so that it may be viewed by the user. In step 308, the user accesses the email server from the unsecure communication device. In step 310, the user enters the acquired single use user ID and password into the dialog displayed on the unsecure communication device. In step 312, the security server authenticates the entered single use user ID and password and grants access to the user's email account if the entered single use user ID and password is correct. In step 314, the user is granted access to their email account on the email server from the unsecure communication device. In step 316, the user logs out of email account, the communication session between the email server and the unsecure communication is terminated and the single use user ID and/or password and any authentication token is deauthorized.

Figure 4:
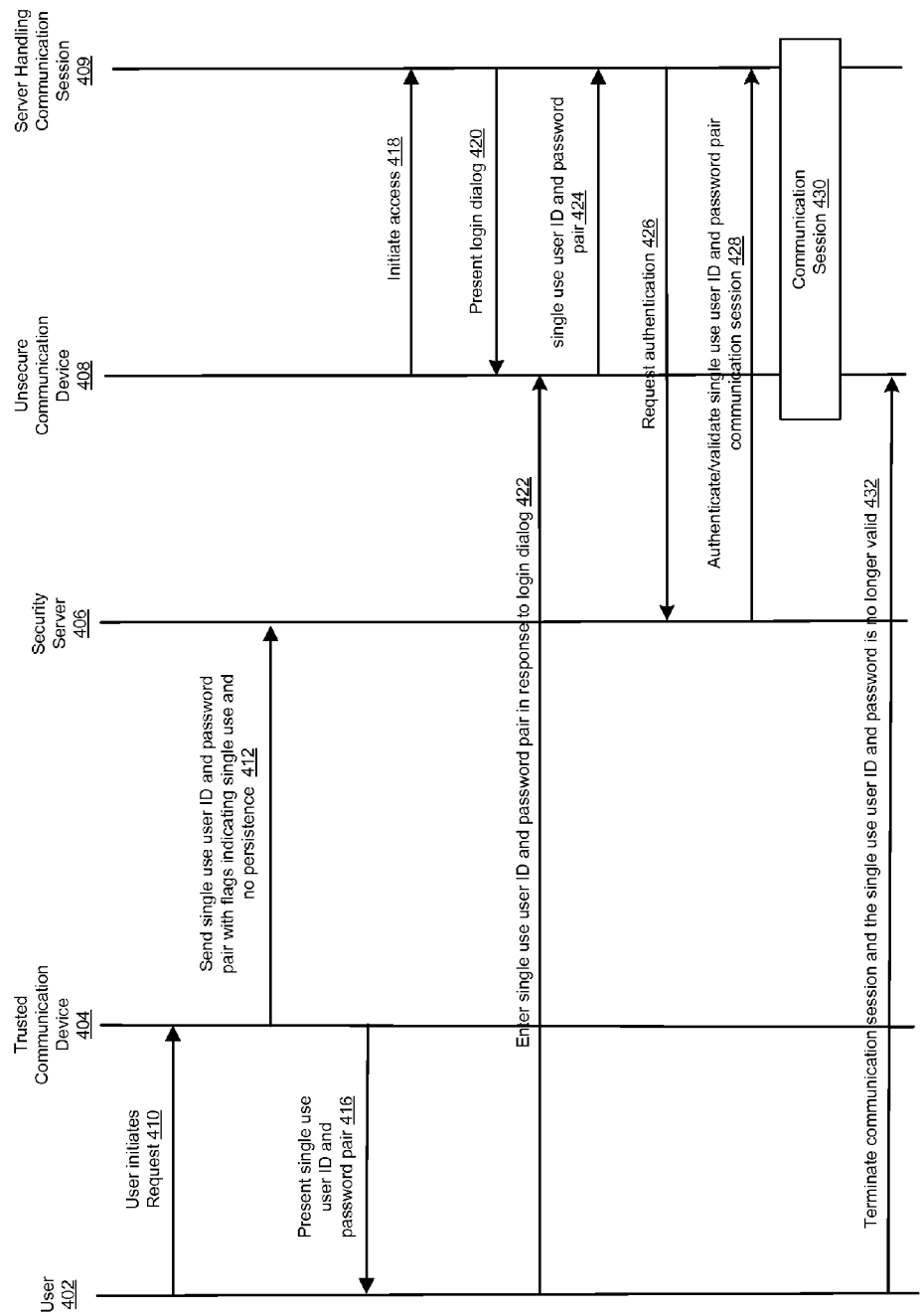
FIG. 4 is a flow diagram illustrating example generation and utilization of one time user login pairs to securely log on to an email server utilizing an unsecure communication device, in accordance with an embodiment of the disclosure.

FIG. 4 is a flow diagram illustrating example generation and utilization of one time user login pairs to securely log on to an email server utilizing an unsecure communication device, in accordance with an embodiment of the disclosure. Referring to FIG. 4, there is shown a user 402, a trusted communication device 404, a security server 406 and an unsecure communication device 408. In 410, the user 402 may initiate a request to the trusted communication device 404. The request may initiate an application on the trusted communication device 404, which is utilized to generate a single use user ID and password, which may be utilized by the user to access, for example, a secure communication session from the unsecure communication device 408. In 412, the user ID and password pair with flags indicating single use and no persistence is communicated from the trusted communication device 404 to the security server 406. In 416, the trusted communication device 404 presents the single use user ID and password pair to the user 402.

In 418, the user 402 utilizes the unsecure communication device 408 to initiate access to the server that is handling the communication session 409. For example, the user 402 may initiate access to the server that is handling the communication session 409 by entering, on the unsecure communication device 408, a URL that corresponds to the server that is handling the communication session 409. In 420, the unsecure communication device 408 presents a login dialog, which may be displayed on the unsecure communication device 408. In 422, the user 402 enters the single use user ID and password pair on the unsecure communication device 408 in response to the login dialog. In 424, the single use user ID and password pair is communicated from the unsecure communication device 408 to the server handling the communication session 409. In 426, the server handling the communication session 409 requests that the security server 406 authenticate the single use user ID and password pair, which is communicated from the unsecure communication device 408 to the server handling the communication session 409. In 428, the security server 406 authenticates/validates the single use user ID and password pair for the communication session. In 430, the communication session between the unsecure communication device 408 and the server handing the communication session 409 occurs. In 432, user 402 terminates the communication session and upon termination of the communication session, the single use user ID and password pair is no longer valid.

A trusted communication device 202, which is operable to communicate with a security server 230, presents a user ID and password pair to be utilized for one time validation of a communication session on an unsecure communication device 250. The communication session occurs between the unsecure communication device 250 and a secure communication device. The unsecure communication device 250, the trusted communication device 202, the security server 230 and the secure communication device are separate and distinct devices. The user ID and password pair are generated by the trusted communication device 202 or the security server 230. When the user ID and password pair is generated by the security server 230, the user ID and password pair is communicated from the security server 230 to the trusted communication device 202. The presented user ID and password pair are utilized on the unsecure communication device 250 to access the communication session from the unsecure communication device 250. For example, a user of the trusted communication device 202 may view the user ID and password pair presented on a display of the trusted communication device 202 and may enter the viewed user ID and password pair into the unsecure communication device 250 to access the communication session from the unsecure communication device 250.

Certain embodiments of the disclosure may be found in a method and system for generation of one time use login pairs via a secure mobile communication device 202 for login on an unsecure communication device 250. In various embodiments of the disclosure, a mobile communication device 202 may be operable to generate one or more single use user ID and/or password, which may be communicated from the mobile communication device 202 to a security server 230. The generated one or more single use user ID and/or password may be utilized for one time validation of a communication session between the unsecure communication device 250 and a secure communication device. In another embodiment of the disclosure, the security server 230 may be operable to generate the one or more single use user ID and password pairs. In instances where the security server 230 generates the one or more single use user ID and password pairs, the security server 230 may be operable to communicate the generated one or more single use user ID and password pairs to the mobile communication device 202.

In an example embodiment of the disclosure, the communication session may comprise a user utilizing the unsecure communication device 250 to access the user's email account on a secure communication device such as the email server 240. In other words, the communication session with the unsecured communication device 250 occurs with a device other than with the security server 230 and the communication device 202. The unsecure communication device 250, the secure communication device such as the email server 240, the mobile communication device 202 and the security server 230 are separate and distinct entities.

The mobile communication device 202 may be operable to visually (e.g., text) and/or aurally (e.g., audio) present the one or more single use user ID and/or password to a user of the mobile communication device 202. The user may utilize the presented one or more user ID and/or password to log into one or more communication sessions from the unsecure communication device 250. For example, the user may enter a presented single use user ID and/or password into a login dialog on the unsecure communication device 250 in order to log into the email server 240 to access the user's email account, which is served by the email server 240. In an aspect of the disclosure, the mobile communication device 202 may be operable to communicate a heartbeat message between the mobile communication device 202 and the security server 230. The presented one or more single use user ID and/or password, and/or one or more corresponding authentication tokens may be deauthorized whenever there is a failure of the heartbeat message. The user of the mobile communication device 202 may manually disable, from the mobile communication device 202, one or more corresponding communication sessions that utilizes the presented one or more user single use ID and password pairs. The presented one or more single use user ID and/or password may be added by the security server to a pool of corresponding valid ID and/or password for one or more corresponding communication sessions that may be handled by the security server 230. The presented one or more single use user ID and/or password may be deleted or otherwise removed, by the security server 230, from the pool of corresponding valid ID and password pairs maintained by the security server 230 after each of the one or more user ID pair is first used. The security server 230 does not create a persistent cookie or other mechanism that allows other users of the unsecure mobile communication device 250 to log in without entering the one or more single use user ID and/or password. The mobile communication device 202 may be operable to dismiss the presented one or more single use user ID and/or password from the mobile communication device 202 after the presented one or more single use user ID and/or password has been displayed for a specified time period.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "example" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Other embodiments of the disclosure may provide a machine or computer readable device, having stored thereon, a machine code and/or a computer program having at least one code section executable by a machine and/or a computer, thereby causing the machine and/or computer to perform the steps as described herein for generation of one time use login pairs via a secure mobile communication device for login on an unsecure communication device.

Accordingly, the present disclosure may be realized in hardware, software, or a combination of hardware and software. The present disclosure may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present disclosure may also be embedded in a computer program product, which comprises all the modules enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method, comprising:
   on a trusted communication device to communicate with a security server, establishing a communication session on an unsecure communication device, by:
     presenting a user ID and password pair for one time validation of the communication session occurring between the unsecure communication device and a secure communication device, with the unsecure communication device, the trusted communication device, the security server and the secure communication device being separate and distinct devices;
     generating the user ID and password pair by one of the trusted communication device and the security server;
     when the user ID and password pair is generated by the security server, communicating the user ID and password pair from the security server to the trusted communication device;
     accessing the communication session from the unsecure communication device using the presented user ID and password pair on the unsecure communication device;
     communicating a heartbeat message between the trusted communication device and the security server; and
     when there is a failure of the heartbeat message, deauthorizing at least one of the group consisting of: the presented user ID and password pair, and one or more corresponding authentication tokens.

2. The method according to claim 1, further comprising:
   presenting the user ID and password pair visually or aurally.

3. The method according to claim 1, further comprising:
logging into one or more communication sessions on the unsecure communication device using the presented user ID and password pair.

4. The method according to claim 1, further comprising:
disabling from the trusted communication device, one or more corresponding communication sessions that utilizes the presented user ID and password pair.

5. The method according to claim 1, further comprising:
adding, by the security server, the presented user ID and password pair to a pool of corresponding valid user ID and password pairs for one or more corresponding communication sessions handled by the security server; and
deleting, by the security server, the presented user ID and password pair from the pool of corresponding valid user ID and password pairs maintained by the security server after it is first used.

6. The method according to claim 1, wherein the security server does not create a persistent cookie or other mechanism that allows other users of the unsecure trusted communication device to log in without entering the user ID and password pair.

7. The method according to claim 1, further comprising:
dismissing the presented user ID and password pair from the trusted communication device after a specified time period has elapsed.

8. A system, comprising:
a processor for user in a trusted communication device to communicate with a security server, the processor to establish a communication session on an unsecure communication device, the processor to:
present a user ID and password pair for one time validation of the communication session to occur between the unsecure communication device and a secure communication device, with the unsecure communication device, the trusted communication device, the security server and the secure communication device being separate and distinct devices;
generate the user ID and password pair by one of the trusted communication device and the security server;
when the user ID and password pair is generated by the security server, communicate the user ID and password pair from the security server to the trusted communication device;
access the communication session from the unsecure communication device using the presented user ID and password pair on the unsecure communication device;
communicate a heartbeat message between the trusted communication device and the security server; and
when there is a failure of the communicated heartbeat message, deauthorize at least one of the group consisting of: the presented user ID and password pair, and one or more corresponding authentication tokens.

9. The system according to claim 8, wherein the processor presents the user ID and password pair visually or aurally.

10. The system according to claim 8, wherein the user utilizes the presented user ID and password pair to log into one or more communication sessions on the unsecure communication device.

11. The system according to claim 8, wherein the processor manually disables from the trusted communication device, one or more corresponding communication sessions using the presented user ID and password pair.

12. The system according to claim 8, wherein:
the presented user ID and password pair is added by the security server to a pool of corresponding valid user ID and password pairs for one or more corresponding communication sessions handled by the security server; and
the presented user ID and password pair is deleted by the security server from the pool of corresponding valid user ID and password pairs maintained by the security server after it is first used.

13. The system according to claim 8, wherein the security server does not create a persistent cookie or other mechanism that allows other users of the unsecure trusted communication device to log in without entering the user ID and password pair.

14. The system according to claim 8, wherein the processor dismisses the presented user ID and password pair from the trusted communication device after a specified time period has elapsed.

15. A computer readable device having stored thereon, a computer program having at least one code section, the at least one code section being executable by a computer for causing the computer to perform steps comprising:
on a trusted communication device to communicate with a security server, establishing a communication session on an unsecure communication device, by:
presenting a user ID and password pair for one time validation of the communication session occurs between the unsecure communication device and a secure communication device, with the unsecure communication device, the trusted communication device, the security server and the secure communication device being separate and distinct devices;
generating the user ID and password pair by one of the trusted communication device and the security server;
when the user ID and password pair is generated by the security server, communicating the user ID and password pair from the security server to the trusted communication device;
accessing the communication session from the unsecure communication device using the presented user ID and password pair on the unsecure communication device;
communicating a heartbeat message between the trusted communication device and the security server; and
when there is a failure of the communicated heartbeat message, deauthorizing at least one of the group consisting of: the presented user ID and password pair, and one or more corresponding authentication tokens.

16. The computer readable device according to claim 15, wherein the at least one code section to further perform the step comprising:
presenting the user ID and password pair visually or aurally.

17. The computer readable device according to claim 15, further comprising:
logging into one or more communication sessions on the unsecure communication device using the presented user ID and password pair.

18. A system, comprising:
a hardware security server to:
validate one or both of an user ID and a password for one time validation of a communication session on an unsecure communication device that communicates with a secure communication device;
invalidate the validated one or both of the user ID and the password after the one or both of the user ID and the password is utilized;
generate the one or both of the user ID and the password by one of the security server and a trusted communication device;

present the generated one or both of the user ID and the password to a user of the trusted communication device;

utilize, by the user of the trusted communication device, the presented one or both of the user ID and the password to access the communication session utilizing the unsecure communication device, with the unsecure communication device, the secure communication device, the trusted communication device and the security server are separate and distinct devices;

communicate a heartbeat message between the trusted communication device and the security server; and when there is a failure of the communicated heartbeat message, deauthorize at least one of the group consisting of: the presented user ID and password pair, and one or more corresponding authentication tokens.

* * * * *